United States Patent [19]
Mok et al.

[11] Patent Number: 5,712,785
[45] Date of Patent: Jan. 27, 1998

[54] AIRCRAFT LANDING DETERMINATION APPARATUS AND METHOD

[75] Inventors: Din Mok, Weston; Marshall Watnick, Trumbull, both of Conn.

[73] Assignee: Northrop Grumman Corporation, Los Angeles, Calif.

[21] Appl. No.: 494,118

[22] Filed: Jun. 23, 1995

[51] Int. Cl.$^6$ .............................. G06G 7/76; G01S 13/00
[52] U.S. Cl. .................. 364/428; 364/439; 364/429; 342/29; 342/32; 342/36; 342/37; 340/948; 340/951; 244/183; 244/184
[58] Field of Search .................... 364/439, 461, 364/560, 550, 454, 427, 428, 424.012, 424.06, 443, 429, 423.098, 424.019; 342/450, 36, 37, 454, 29, 39, 455, 456, 32, 160; 340/933, 552, 953, 948, 951, 972, 963, 450; 244/183, 187, 186, 188, 182; 73/178 T

[56] References Cited

U.S. PATENT DOCUMENTS

| | | | |
|---|---|---|---|
| 4,516,125 | 5/1985 | Schwab et al. | 342/36 |
| 5,107,268 | 4/1992 | Storm et al. | 342/36 |
| 5,334,982 | 8/1994 | Owen | 342/36 |
| 5,343,395 | 8/1994 | Watts | 364/443 |
| 5,374,932 | 12/1994 | Wyschogrod et al. | 342/36 |
| 5,375,058 | 12/1994 | Bass | 364/439 |
| 5,400,031 | 3/1995 | Fitts | 342/36 |
| 5,469,371 | 11/1995 | Bass | 364/439 |
| 5,519,618 | 5/1996 | Kastner et al. | 364/439 |
| 5,557,278 | 9/1996 | Piccirillo et al. | 342/29 |

OTHER PUBLICATIONS

"Airport Movement Area Safety System", by Marshall Watnick and Joseph M. Ianniello, United Technologies Norden Systems, Inc. prepared for IEEE/AIAA Digital Avionics Systems Conference, Seattle, WA, Oct. 5–8, 1992.

"Airport Surface Collision Warning System Implementation", by J. Ianniello, R. Kruczek, United Technologies Norden Systems, Inc., presented at IEEE/AIAA Digital Avionics Systems Conference and Technical Display, Forth Worth, TX, Oct. 25–28, 1993.

*Primary Examiner*—Jacques Louis-Jacques
*Attorney, Agent, or Firm*—Walter G. Sutcliff

[57] ABSTRACT

An aircraft landing determination apparatus and method for determining landing status of an aircraft by tracking arriving aircrafts and providing a unique runway assignment therefor. The aircraft landing determination apparatus includes a target processor, a track administrator, and a track reporter. The target processor culls multiple target tracks from a target data transmission provided by a target sensor. The track administrator receives the target tracks, selects at least one arrival track therefrom, and allocates a unique runway assignment to each arrival track. The track reporter receives the arrival track and runway assignment, prepares a track report thereabout, and transmits the track report to a position monitoring apparatus. The method according to the present invention tracks aircrafts approaching a predefined space and can include correlation of selected targets to tracks, thereby confirming track candidate status, and drop zone tracking of the arriving track candidate through at least a portion of a drop zone.

23 Claims, 3 Drawing Sheets

AIRCRAFT LANDING DETERMINATION APPARATUS AND METHOD

BACKGROUND OF THE INVENTION

This application is related to U.S. Pat. No. 5,557,278 filed as U.S. Pat. No. 08/494,119 on Jun. 23, 1995, entitled "Airport Integrated Hazard Response Apparatus," which is incorporated herein by reference, and which is assigned to the same assignee hereof.

1. Field of the Invention

The invention herein relates to an apparatus and method for determining the landing status of an aircraft. More particularly, the present invention relates to an apparatus and method for tracking arriving aircraft and providing a unique runway assignment therefor.

2. Description of the Prior Art

Accidents involving aircraft and ground vehicles and aircraft ground collisions can occur at busy airports. More than three times as many near-accidents occur on the ground as in the air. In one such accident, an aircraft strayed onto the wrong runway and was struck by a second aircraft, resulting in a loss of life. In another accident, two aircraft collided when one aircraft was cleared to land on an occupied runway. Continuous situation monitoring in fog, snow, at night, and under other adverse conditions, can cause fatigue in human controllers which may lead to a collision between objects on airport surfaces.

Medium-range airport surveillance radar, such as the Automated Radar Terminal System (ARTS) is good for detecting and tracking many aircraft within a large volume of airspace. However, such systems do not provide adequate surveillance coverage for ground-resident objects, including aircraft that are in the taxing, holding (stopped), takeoff or landing phases of their flight profiles. In addition, ARTS may not provide adequate information regarding aircraft which are on final approach for landing which may be used by controllers to anticipate conflict situations with objects on and near the ground.

Airport surface detection equipment (ASDE) systems can provide high-resolution, short-range, clutter-free, surveillance information on aircraft and ground vehicles, both moving and fixed, located on or near the surface of airport movement and holding areas under all weather and visibility conditions. An ASDE system formats incoming surface detection radar information for a desired coverage area, and presents it to local and ground controllers on high-resolution, bright displays in the airport control tower cab.

However, an ASDE system will be effective only if the controllers are observing the radar display, which may be unlikely during good visibility conditions. The increasing sophistication of electronic equipment in air traffic control towers can result in an increasing number of computer displays and alarms. The large number of displays and keyboards in the tower cab can result in a cramped and cluttered environment which may be relieved by an integrated display system. In addition to ASDE and ARTS systems, other sensor systems such as, for example, secondary surveillance radar (SSR), and global positioning system (GPS) can provide logically disparate parameters in physically disparate locations within the tower cab, further adding to the controllers' burden. The lack of integration between sensor systems in the tower cab, including ARTS, ASDE, SSR, GPS, and the like, can yield gaps in controller awareness of an unfolding situation.

In addition, a large, busy airport is an environment having a vast number of possible conflict situations. In such a dynamic environment, the potential for collision between any given aircraft and any one of possibly many ground-resident, and nearby airborne, objects may not be recognized until it is too late to avoid the collision. Also, the occurrence of a conflict in one area of the airport may draw controllers' attention away from evolving conflict situations.

What is needed is an apparatus and method that can track arriving aircraft in the approach areas of an airport; determine an intended runway to be used by each arriving aircraft; and provide information for automatic monitoring of potential surface conflicts with arriving aircraft.

SUMMARY OF THE INVENTION

The invention described herein provides an aircraft landing determination apparatus which includes a target processor, a track administrator, and a track reporter. The target processor can cull multiple target tracks of interest from a target data transmission provided by a target sensor. The track administrator receives the target tracks, selects at least one arrival track therefrom, and allocates a unique runway assignment to each arrival track. The track reporter receives the arrival track and runway assignment, prepares a track report thereabout, and transmits the track report to a position monitoring apparatus. The landing determination apparatus can further include a site data manager for maintaining multiple predetermined physical and operational features, and providing selected ones of the features to the track administrator.

The target processor can include a target data receiver for receiving a target data transmission, and a target extractor for selecting the multiple target tracks from the target data transmission. The track administrator can include a target acquirer for acquiring selected ones of the multiple target tracks, a target tracker for tracking positions of the selected target tracks, and a track manager. The target tracker can include an alpha-beta tracker. The track manager can identify track candidates from the selected target tracks responsive to the positions, select at least one arrival track from the track candidates, correlate a selected track to a predicted parameter, and allocate a unique runway assignment to each arrival track. The target administrator can also include a drop zone processor for tracking the arrival track in a drop zone.

The tracking of selected target tracks by track administrator can include predicting a respective predicted parameter of the selected tracks based upon a preselected existing parameter. The predicted parameter can be the predicted target position. The target tracker uses a fixed prediction region of a predetermined size for predicting the predicted target position, with the prediction region being approximately centered on the predicted target position. The preselected existing and predicted parameters can also include target position, target velocity, target distance, and target direction.

The invention herein also includes a method for tracking aircraft approaching predefined space having an airport therein. This method can include receiving a target data transmission from a target sensor; extracting multiple target tracks from the target data transmission; tracking movement of a track candidate from the multiple target tracks; identifying a flight status of the track candidate according to a predefined rule set; allocating a unique runway assignment to the track candidate having the flight status of an arrival status; and transmitting the arriving track candidate with the unique runway assignment to a position monitoring apparatus. In addition, the method can include drop zone tracking of the arriving track candidate through at least a portion of a drop zone.

Movement tracking can use target/track correlation which includes generating a prediction box associated with the movement and with a preselected portion of the predefined space around and including the airport; choosing a selected target contained within the prediction box at a first time, and obtaining a first group of parameters associated with the selected target at the first time; creating a track for the selected target corresponding to the selected target movement; and obtaining a second group of parameters associated with the selected target at a second time.

The method can employ a multi-pass correlation scheme for target/track correlation the first pass of which can include comparing first selected ones of the first group of parameters with first selected ones of the second group of parameters; if the first selected ones of the first group match the first selected ones of the second plurality, then assigning the target to the track, thereby confirming the target as a track candidate.

If the first selected ones of the first group of parameters fail to match the first selected ones of the second group of parameters, then performing a second correlation pass which includes comparing second selected ones of the first group with second selected ones of the second group. If the second selected ones of the first group match the second selected ones of the second group, then assigning the target to the track, thereby confirming the target as a track candidate.

If the second selected ones of the first group fail to match the second selected ones of the second group, then the third pass of the correlation is performed by comparing third selected ones of the first group with third selected ones of the second group. If the third selected ones of the first group match the third selected ones of the second group, then assigning the target to the track, thereby confirming the target as a track candidate. If the third selected ones of the first group fail to match the third selected ones of the second plurality, then the target is assigned a failed correlation target. Track initiation can be performed for a failed correlation target so that a correlation can be obtained, even if the correlation is one of reduced confidence. Among the parameters that can be used in correlation are target position, target velocity, target distance, target direction, aircraft identification, controller symbol, and altitude. In the third pass, the parameter can be proximity of the selected target to a predicted position of the track.

Target tracking can further include predicting a respective predicted parameter for selected ones of the multiple target tracks using a preselected existing parameter. Such existing and predicted parameters can include target position, target velocity, target distance, and target direction.

Other details, objects, and advantages of the invention will become apparent as the following description of certain present preferred embodiments thereof proceeds. The accompanying drawings show presently preferred embodiments of the invention.

DETAILED DESCRIPTION OF THE PREFERRED EMBODIMENTS

Figure 1:
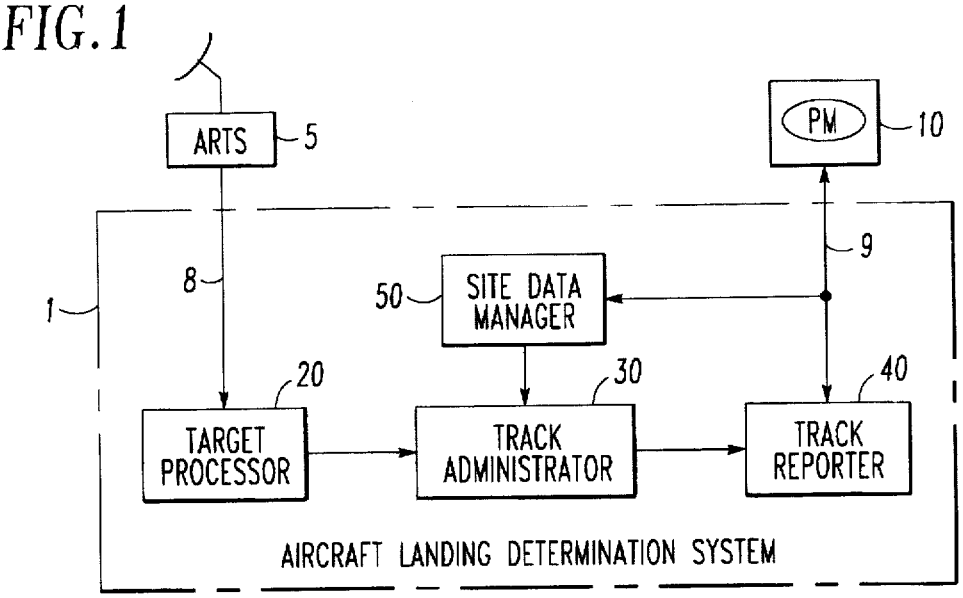
FIG. 1 is a diagram of an aircraft landing determination apparatus according to the invention herein.

FIG. 1 illustrates aircraft landing determination system (ALDS) 1 which can provide an interface to the ARTS equipment through which surveillance and aircraft tag data may be accessed. ALDS 1 can process the data to identify all targets currently present in the runway approach regions. Also, ALDS 1 can develop a corresponding file of target records, each of which can contain relevant information such as target number, aircraft identification, altitude, position, velocity, and direction, and can follow a preselected number of concurrent aircraft tracks in the airport approach areas.

ALDS 1 can receive target data transmission 8 from ARTS sensor 5 and can transmit track report 9 to position monitoring apparatus (PM) 10. Data output by ARTS sensor 5 can be an associated track, that is, an ARTS track that has been associated with a flight plan or, or an unassociated track, which has not been associated with a flight plan. Both associated and unassociated tracks can include location in terms of X, Y coordinates, and track symbols. Target types can include single symbol (SS), full data block (FDB), partial or limited data block (PDB or LDB), and minimum safe altitude warning/conflict alert data block (MSAW/CA).

All target types can be designated by an associated controller symbol, by unassociated symbols, or by radar only. Target types can have a measured X, Y position within a tolerance of approximately 1/16 nautical miles (nmi) or 380 feet. Only FDB and MSAW/CA targets have aircraft I.D. and velocity data. FDB, MSAW/CA, and PDB/LDB targets have altitude and scratch pad data. Single symbols may have only symbol data.

Because the target data transmission may be provided by unit 5 to ALDS 1 at a rate faster than actual ASR-9 sensor updates, redundant targets can be filtered out.

Target processor 20 culls from the target data transmission of ARTS sensor 5, multiple lander track candidates. In target processor 20, targets are extracted from the target data transmission and grouped by target type. Additionally, target processor 20 removes redundant target tracks. Once a target has been identified by target processor 20, it is handed off to track administrator 30.

Track administrator 30 acquires likely track candidates from the target data transmission, follows the track in time, identifies tracks as arrival tracks, and allocates a unique runway assignment to each lander track. In addition, target administrator 30 maintains a list of all identified tracks, and the runways allocated thereto, as well as other track files. Also, target administrator 30 determines whether to continue to follow a particular lander track that has been lost, or dropped, from radar coverage by predicting track landing based on previous speeds, distances, and directions.

In track administrator 30, targets within a predefined region of the airport can be tracked in time by predicting its movement during subsequent ARTS scans. A target can be selected for tracking when it comes within a predefined polygonal region, or acquisition box, of the airport approach area. Targets located outside of an acquisition box may not be considered as track candidates. If the target remains within a predefined region, or box, the target movement may be predicted and can be correlated to a track, thereby becoming a track candidate.

Track reporter 40 can prepare a track report about each respective arrival track and transmit that track report to position monitor (PM) 10. Track reporter 40 can reformat the track report to be compatible with the coordinate and geometric formatting of PM 10, and effect the transmission protocols necessary to communicate the track report to PM 10.

Site data manager 50 can be used to maintain a plurality of predetermined physical and operational features of the airport and adjacent areas. Airport and site-specific data including airport configuration, locations of airport sensor systems, and the like, can be entered locally or from PM 10 during off-line system set-up or during a non-real-time system parameter updating. Selected features can be requested by and provided to track administrator 30, as needed.

Figure 2:
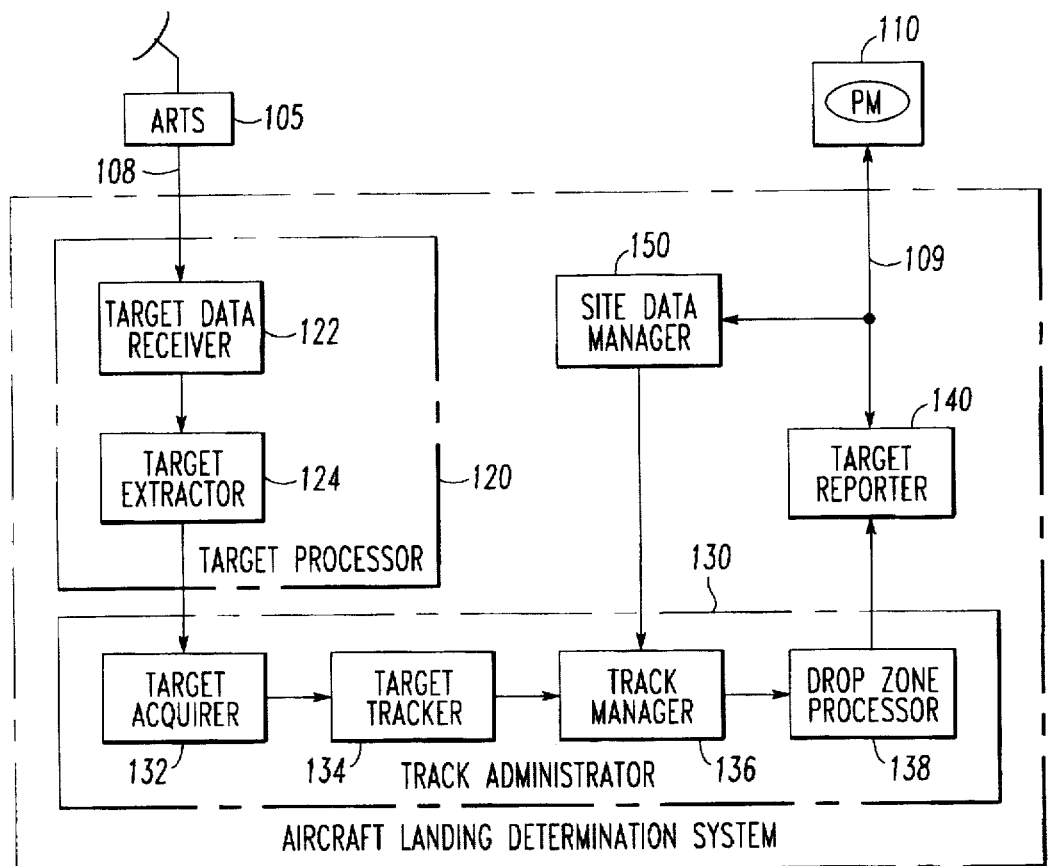
FIG. 2 is a diagram of another embodiment of an aircraft landing determination apparatus according to the invention herein.

FIG. 2 illustrates ALDS 100 with a preferred embodiment for target processor 120 and a preferred embodiment for target administrator 130. A target data transmission 108 from ARTS sensor 105 is received by target data receiver 122.

In general, target data receiver 122 controls the information flow between ARTS sensor 105 and ALDS 100 including communication protocol management, parity checking, incoming data buffering, and the like. Receiver 122 can also reformat data from the format native to ARTS 105 to one used within ALDS 100, if necessary. Target extractor 124 can receive the output of receiver 122, which output generally contains data regarding a plurality of airborne targets. Among the data that can be transmitted for each target from ARTS sensors 105 to ALDS 100 can be target type, reported X, Y position, controller symbol, aircraft I.D., altitude, ground speed, scratch pad data, leader direction code, scratch pad left/right assignment, ARTS coast indication, and other data.

Depending upon the amount and type of data available for each target, target extractor 124 examines the target data from receiver 122, identifies the target by data field types including A, B, and C words, and extracts targets using these data field types. In addition, extractor 124 groups targets by target type such as, for example, SS, PDB, FDB, MSAW/CA. Also, target extractor 124 performs redundancy filtering to remove redundant data. Redundancy filtering can be necessary due to a higher rate of data input by ARTS sensor 5 than receipt by position monitor 10. Targets may be processed only if a target's X, Y position has changed.

The data thus filtered can be received by target acquirer 132 in target administrator 130. In general, airport approach areas can be created by adjoining multiple, four-sided polygons, or acquisition boxes. It is preferred that a target be processed only if it is inside an acquisition box. When acquirer 132 determines that an airborne target is within one of these acquisition boxes, the target is selected to be tracked, and is then handed-off to target tracker 134 to determine whether the target is a valid target.

Once a target is acquired during a particular scan of ARTS sensor 105, tracker 134 monitors the location of each target in each acquisition box during consecutive subsequent scans. Each time a target appears in a particular acquisition box, it is determined to be a "hit". It is preferred that, after a target is initially acquired, it be detected for a predefined number of consecutive "hits" to be considered a valid target. In one embodiment, it is preferred that five consecutive hits be used to determine whether a target is valid. On the other hand, a target is considered a "coast" after it fails to provide additional information on two consecutive ARTS scans. After four such coasts, the target can be dropped.

Subsequent tracking of valid targets can include prediction of a position and velocity of a target during the next scan. Fixed prediction regions, or prediction boxes, can be used by tracker 134 for each subsequent scan to determine whether the target should be the subject of correlation analysis. To enhance prediction, and position and velocity smoothing, an alpha-beta tracker can be used in tracker 134. If the target fails to appear in the predicted location after a predetermined number of scans by ARTS sensor 105, the track is considered a "coast". After a consecutive number of coasts, the target can be dropped from further tracking.

All targets in prediction boxes are candidates for track correlation. In general, factors such as time, position, target type, track data, aircraft I.D., altitude, and controller symbol will determine correlation. Target tracker 134 can provide a target I.D. for targets from ARTS sensor 105 which lack aircraft I.D.

To perform correlation, a track is created for each target. It is preferred that three levels of correlation rules handle target/track type combinations and transition period. For track correlation, each track can contain a time counter which determines a minimum expected correlation time, such as, for example, approximately four seconds. If a track does not correlate within the maximum expected time, for example, approximately seven seconds, the track will be coasted.

A prediction box is presently preferred to be an approximately 1.25 nmi box centered about the predicted target position, although prediction boxes of other dimensions may also be used. This prediction box can be rotated in the direction of the track. Target/track directions are checked for a maximum allowable turning, for example, 30° per 4.5 second scan. During track correlation, target/track controller symbols and aircraft I.D. can be checked for consistency. Target/track altitudes can also be checked for a maximum allowable change, such as, for example, 200 feet per 4.5 second scan. Correlation can also be determined by the distance from the track's predicted position.

Correlation also can be effected by using a predetermined number of correlation iterations or passes. In one embodiment of the present invention, it is preferred to use a three-pass correlation scheme in which the parameters of time, prediction box, direction, and distance are common to all three passes. In this embodiment, the first pass correlates a track with a target which contains all available data for a given data block type. For example, a FDB track/target pair can have a match in aircraft I.D., controller symbol and altitude. Where first correlation pass data is incomplete, a second correlation can be used to correlate the track/target pair. Such example of reduced confidence data can include a FDB track/target pair with missing altitude, a FDB which changes controller symbols, or a PDB which changes to a FDB. In such cases, the parameters of either aircraft I.D. or altitude determine the correlation. The third correlation can correlate tracks and targets using the parameter of proximity to a track's predicted position. This pass can be used when the ARTS data block information is missing such as, for example, with single symbols or when major differences exist between parameters.

Targets which fail correlation are candidates for track initiation. For track initiation, a target's measured X and Y position should be inside an airport acquisition area for tracking to occur. Those targets which have X, Y positions inside predicted boxes of previously correlated tracks may not cause a new track to be allocated. Tracks can be dropped for predetermined criteria. For example, tracks which fail to correlate upon the second scan may not be coasted but may be immediately dropped. Also, tracks with velocities greater than 300 knots can be dropped. In addition, tracks with "departing" direction can be dropped.

Correlated target/track pairs can be transmitted to track manager 136 where tracks can be further identified as arrival tracks according to predetermined selection criteria. Such criteria can include, for example, the distance from the airport, the absolute altitude of the aircraft, and the amount that the altitude has changed since track acquisition.

In addition, track manager 136 can add, delete, index, update, and otherwise maintain a track file for all tracks under surveillance. Data in such track file can include the measured, smoothed, and predicted position of a track; smoothed velocity and direction of a track; and predicted correlation box and error data. Also maintained are ARTS target type and decoded data, track status, coast count, and time.

When a track has been determined to be an arrival track, manager 136 allocates a unique runway assignment to each identified lander track. Track position and direction are compared to airport runway approach areas and direction windows. A direction window can indicate that the preferred direction for traffic movement is a particular runway approach area. Arrival on substantially parallel paths can use data found in the scratch pad of the input data to provide the left/right assignment. Single aircraft arrivals can use a runway centerline check to determine left/right assignment.

At approximately 1.5 nmi distance from the airport, ARTS sensor 105 can drop FDB targets, and reacquire them as LDB targets. Drop zone processor 138 can detect when a track has entered the ARTS drop zone, and can project a track's position with regard to the preassigned runway threshold. The positional reports for targets which are parallel lander targets can be corrupted. Therefore, single targets can be tracked through the drop zone, and parallel targets can be coasted through the drop zone. Drop zone processor 138 can use a distance parameter check to detect single and parallel lander tracks. In one embodiment, the preferred distance parameter is approximately 0.5 nmi.

Track reporter 140 can format and transmit track reports to position monitoring apparatus 110. Reporter 140 can handle message protocols, data buffering, error checking, and transmission management. Track reporter 140 also can perform geometric formatting of track locations which can provide compatibility with the coordinate system of position monitoring apparatus 110. The track report contains information such as track I.D., status and coast count, the X and Y position of the target, the X and Y components of smooth target velocity, target direction, approach area, approach area polygon, and left/right runway indicator.

Site data manager 150 can maintain airport dependent parameters. Also, site data manager 150 can transform the coordinates of the airport database and other site dependent parameters from a format compatible with ALDS 100 to a format compatible with position monitoring apparatus 110, and vice versa.

Figure 3:
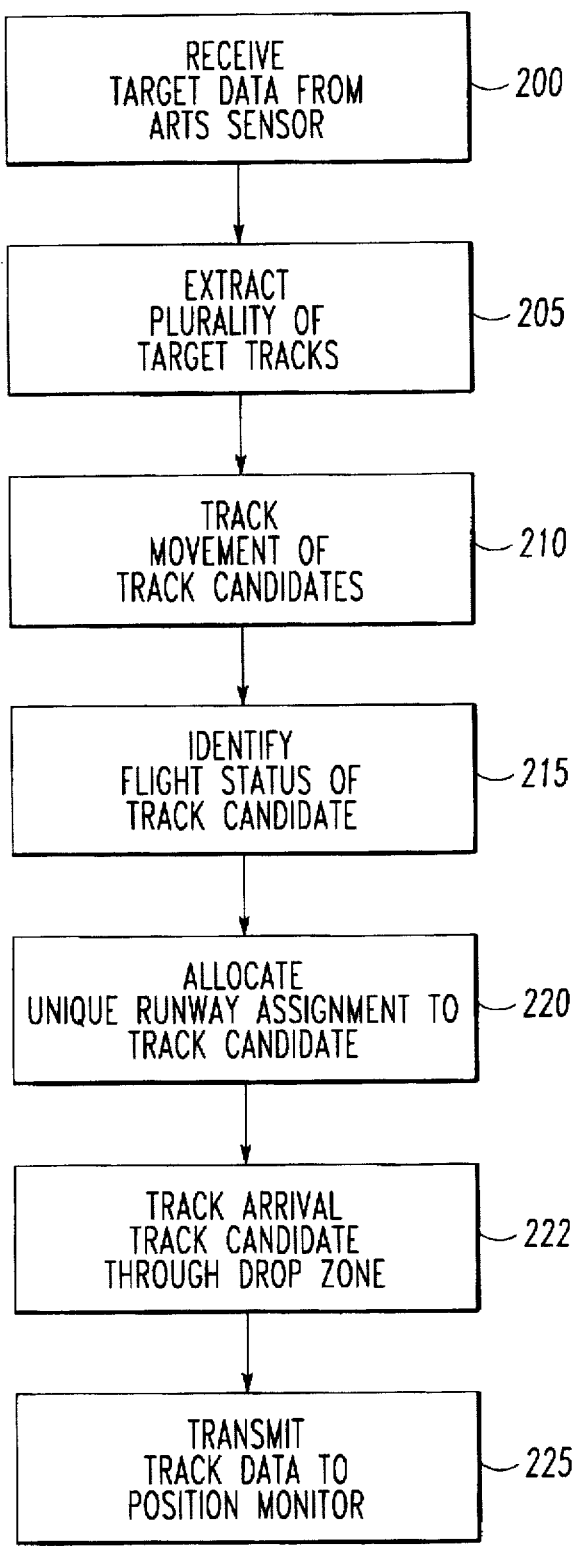
FIG. 3 is a flow chart illustrating the operation of one embodiment of the present invention.

One embodiment of the method according to the invention herein, as practiced on an embodiment of an apparatus described above, and as seen in FIG. 3, includes receiving a target data transmission from an ARTS sensor, step 200, and extracting a plurality of target tracks from that target data transmission, step 205. Tracking movement of at least one track candidate, step 210, can be effected, and identifying a flight status of the track candidate, step 215, can be performed according to a predefined rule set. If the track candidate is identified as having an arrival status, the method can include allocating a unique runway assignment for the track candidate so identified, step 220, and transmitting the track candidate, arrival status, and unique runway assignment to a position monitoring apparatus, step. 225. Further, the method herein can include tracking the track candidate having an arrival status through at least a portion of a drop zone, step 222. Tracking, step 210, can further include predicting a respective predicted parameter for selected ones of the target tracks using a preselected existing parameter. Such parameters can include target position, target velocity, target distance, and target direction.

Figure 4:
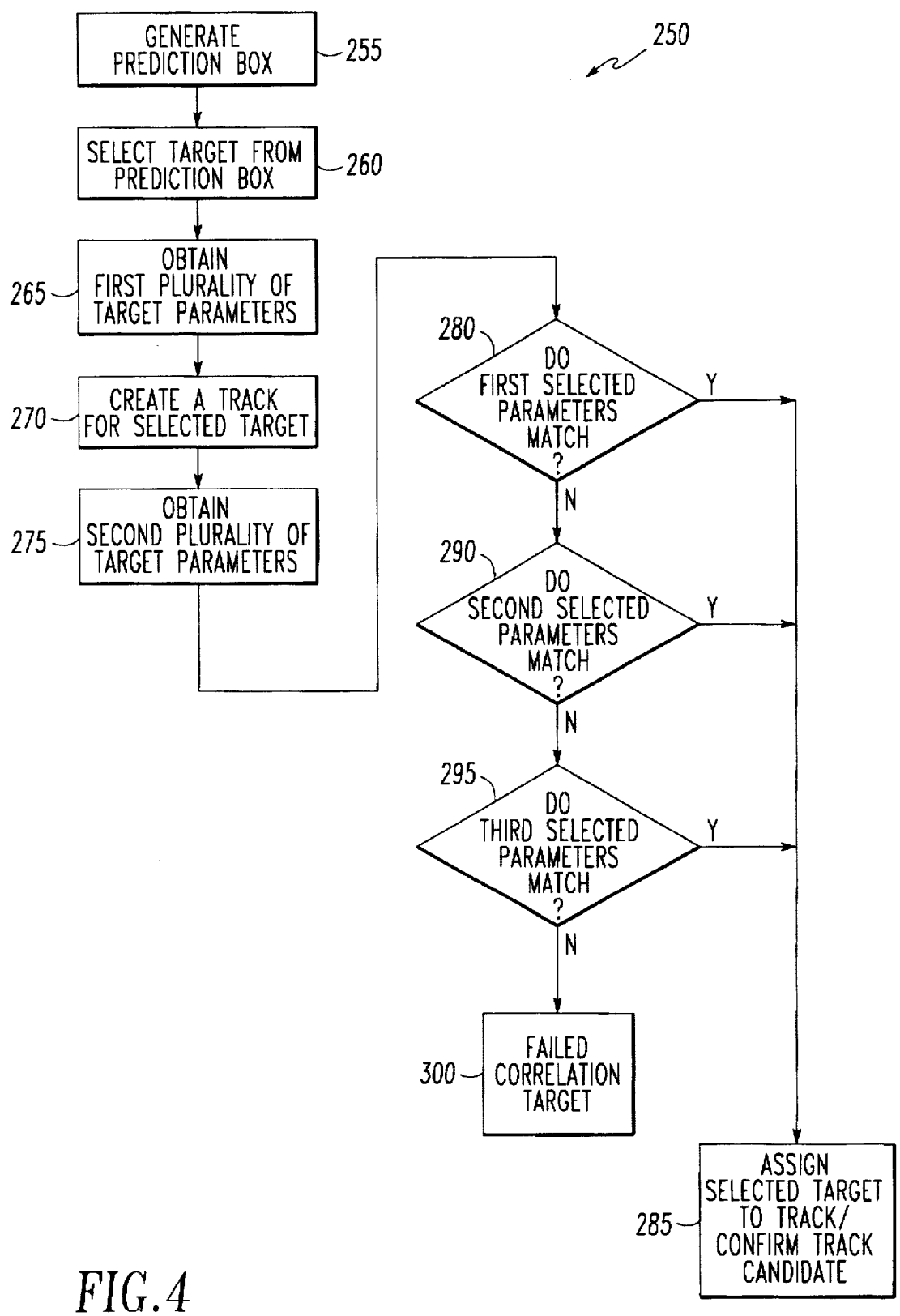
FIG. 4 is a flow chart illustrating the steps in a target/track correlation.

Tracking, step 210, can also include target/track correlation, generally 250, as seen in FIG. 4. Target/track correlation 250 can begin with generating a prediction box associated with target movement in a preselected portion of the predefined space including the airport, step 255. At a first time, a selected target is chosen from the prediction box, step 260, and a first plurality of parameters associated with the selected target and the first time are obtained, step 265. The method continues by creating a track for said selected target that corresponds to the selected target's movement, step 270; obtaining a second plurality of parameters at a second time, step 275; and comparing the first selected ones of the first plurality of parameters with the first selected ones of the second plurality, step 280.

If the first selected ones of the first plurality of parameters match the first selected ones of the second plurality at step 280, the method includes assigning the selected target to the track, thereby confirming the track as a track candidate, step 285. However, if the first selected ones of the first plurality fail to match the first selected ones of the second plurality, step 280, the method proceeds by comparing second selected ones of the first plurality with second selected ones of the second plurality, step 290. If the second selected ones of the first plurality of parameters match the second selected ones of the second plurality at step 290, the method permits assigning the target to the track, step 285, thereby confirming the selected target as a track candidate.

On the other hand, if the second selected ones of the first plurality of parameters fail to match the second selected ones of the second plurality at step 290, the method continues by comparing third selected ones of the first plurality of parameters with third selected ones of the second plurality, step 295. If, at step 295, the third selected ones of the first plurality of parameters matches the third selected ones of the second plurality, the method permits assigning the target to the track, step 285, thereby confirming the selected target as a track candidate. If the third selected ones of the first plurality of parameters fail to match the third selected ones of the second plurality, the method proceeds by assigning said target to a failed correlation target, step 300.

Such first and second pluralities of parameters can include target position, target velocity, target distance, target direction, aircraft I.D., controller symbol, altitude, and proximity to a track's predicted position.

While specific embodiments of practicing the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting to the scope of the invention which is to be given the full breadth of the following claims, and any and all embodiments thereof.

We claim:

1. An aircraft landing determination apparatus for use at an airport, comprising:

(a) a target track processor for culling a plurality of target tracks from a target data transmission, said target data transmission being provided by a target track sensor;

(b) a track administrator for receiving said plurality of target tracks and selecting at least one arrival track therefrom, said track administrator including i) a target acquirer for acquiring selected ones of said plurality of target tracks, ii) a target tracker for tracking positions of said selected ones of said plurality of target tracks, and iii) a track manager for identifying track candidates from said selected ones of said plurality of target tracks responsive to said positions and selecting said at least one arrival track from said track candidates and allocating a unique runway assignment to said at least one arrival track; and (c) a track reporter for receiving said at least one arrival track and said allocated unique runway assignment, and preparing a track report thereabout, said reporter transmitting said track report to a position monitoring apparatus, wherein said track reporter reformatting said track report and effecting transmission protocols necessary to communicate the track report to the position monitoring apparatus.

2. The apparatus of claim 1 further including a site data manager for maintaining a plurality of predetermined physical and operational features, said site data manager providing said selected ones of said plurality of predetermined physical and operational features to said track administrator.

3. The apparatus of claim 1 wherein said target processor further comprises:

(a) a target data receiver for receiving a target data transmission; and (b) a target extractor for selecting said plurality of target tracks from said target data transmission.

4. The apparatus of claim 1 wherein said target administrator further comprises a drop zone processor for tracking said at least one arrival track in a drop zone.

5. The apparatus of claim 1 wherein said track administrator includes tracking selected ones of said plurality of target tracks, said tracking including predicting a respective predicted parameter of said selected ones using a preselected existing parameter.

6. The apparatus of claim 5 wherein said respective predicted parameter is predicted target position and said target tracker uses a fixed prediction region of a predetermined size for said predicting said predicted target position, said prediction region being approximately centered on said predicted target position.

7. The apparatus of claim 6 wherein said predetermined size for said prediction region is about 1.25 nautical miles.

8. The apparatus of claim 5 wherein said preselected existing parameter includes at least one of target position and target velocity and target distance and target direction and said respective predicted parameter includes at least one of target position and target velocity and target distance and target direction.

9. The apparatus of claim 1 wherein said target tracker further includes an alpha-beta tracker.

10. An aircraft landing determination apparatus for use at an airport, comprising:

(a) a target track data receiver for receiving a target track data transmission;

(b) a target track extractor for selecting a plurality of target track tracks from said target data transmission;

(c) a target track acquirer for acquiring selected ones of said plurality of target tracks;

(d) a target tracker for tracking positions of said selected ones of said plurality of target tracks;

(e) a track manager for identifying track candidates from said selected ones of said plurality of target tracks responsive to said positions and selecting said at least one arrival track from said track candidates and allocating a unique runway assignment to said at least one arrival track;

(f) a drop zone processor for tracking said at least one arrival track in a drop zone;

(g) a site data manager for maintaining a plurality of predetermined physical and operational features, said site data manager providing said selected ones of said plurality of predetermined physical and operational features to said track manager; and (h) a track reporter for receiving said arrival track and said runway assignment, and preparing a track report thereabout, said track reporter transmitting said track report to a position monitoring apparatus.

11. The apparatus of claim 10 wherein said track manager includes means for tracking selected ones of said plurality of target tracks, said means for tracking including means for predicting a respective predicted parameter of said selected ones using a preselected existing parameter.

12. The apparatus of claim 11 wherein said respective predicted parameter is predicted target position and said target tracker uses a fixed prediction region of a predetermined size for predicting said predicted target position, said prediction region being approximately centered on said predicted target position.

13. The apparatus of claim 11 wherein said preselected existing parameter includes at least one of target position and target velocity and target distance and target direction and said respective predicted parameter includes at least one of target position and target velocity and target distance and target direction.

14. The apparatus of claim 10 wherein said target tracker further includes an alpha-beta tracker.

15. A method for tracking aircraft approaching predefined space having an airport therein, comprising the steps of:

(a) receiving a target track data transmission from a target sensor;

(b) extracting a plurality of target tracks from said target data transmission;

(c) tracking movement of a track candidate from said plurality of target tracks;

(d) generating a prediction box associated with said movement and with a preselected portion of said predefined space;

(e) choosing a selected target contained within said prediction box at a first time;

(f) obtaining a first plurality of parameters associated with said selected target and said first time;

(g) creating a track for said selected target, said track corresponding to a movement of said selected target;

(h) obtaining a second plurality of parameters at a second time;

(i) comparing first selected ones of said first plurality with first selected ones of said second plurality;

(j) if said first selected ones of said first plurality match said first selected ones of said second plurality, assigning said target to said track, confirming said track candidate thereby;

(k) if said first selected ones of said first plurality fail to match said first selected ones of said second plurality, comparing second selected ones of said first plurality with second ones of said second plurality;

(l) if said second selected ones of said first plurality match said second selected ones of said second plurality, assigning said target to said track, confirming said track candidate thereby;

(m) if said second selected ones of said first plurality fail to match said second selected ones of said second plurality, comparing third selected ones of said first plurality with third selected ones of said second plurality;

(n) if said third selected ones of said first plurality match said third selected ones of said second plurality, assigning said target to said track, confirming said track candidate thereby;

(o) if said third selected ones of said first plurality fail to match said third selected ones of said second plurality, assigning said target to a failed correlation target;

(p) identifying a flight status of said track candidate according to a predefined rule set;

(q) allocating a unique runway assignment to said track candidate having said flight status and being an arrival status; and (r) transmitting said track candidate having said arrival status and said unique runway assignment to a position monitoring apparatus.

16. The method of claim 15 further comprising the step of drop zone tracking said track candidate having said arrival status through at least a portion of a drop zone.

17. The method of claim 15 wherein the step of tracking further comprises the step of predicting a respective predicted parameter for selected ones of said plurality of target tracks using a preselected existing parameter.

18. The method of claim 17 wherein said preselected existing parameter includes at least one of target position and target velocity and target distance and target direction and said respective predicted parameter includes at least one of target position and target velocity and target distance and target direction.

19. The method of claim 17 wherein the step of tracking further comprises the step of correlating said movement of said target to a track candidate.

20. The method of claim 19 wherein the step of correlating is a multi-pass correlation method.

21. The method of claim 20 wherein said multi-pass correlation method is a three-pass correlation method.

22. The method of claim 15 further comprising the step of performing track initiation for said failed correlation target.

23. The method of claim 15 wherein each of said first and second plurality of parameters includes at least one of target position and target velocity and target distance and target direction and aircraft identification and controller symbol and altitude and proximity of said selected target to a predicted position of said track.

* * * * *